Oct. 9, 1956  R. A. SPITLER  2,765,508
METHOD OF PROTECTING MOLD SURFACE DURING PLACEMENT
OF METAL INSERTS IN A TIRE MOLD
Filed March 18, 1953  2 Sheets-Sheet 1
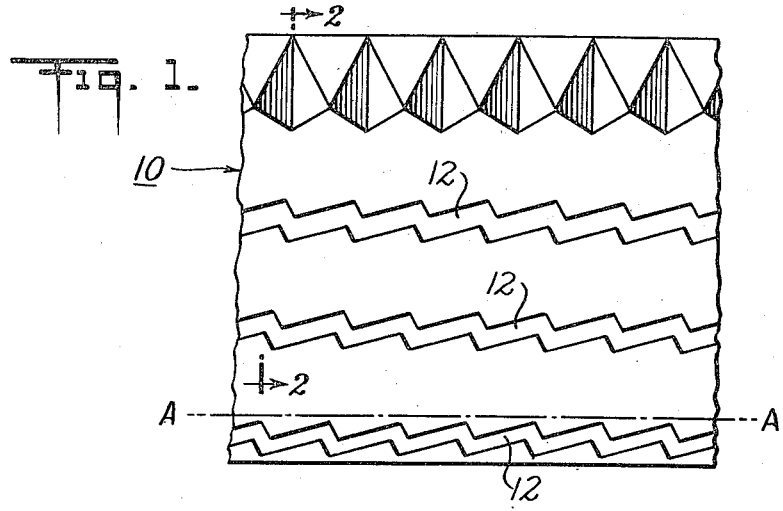
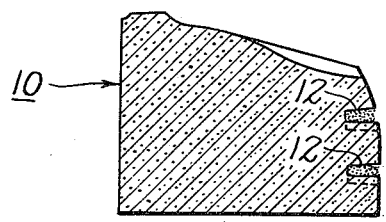
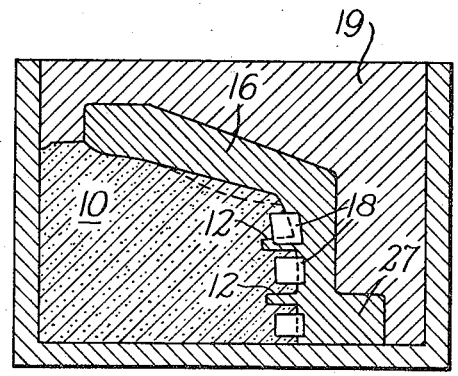
INVENTOR.
Robert A. Spitler
BY Curtis, Morris & Safford
ATTORNEYS Oct. 9, 1956  R. A. SPITLER  2,765,508
METHOD OF PROTECTING MOLD SURFACE DURING PLACEMENT
OF METAL INSERTS IN A TIRE MOLD
Filed March 18, 1953  2 Sheets-Sheet 2
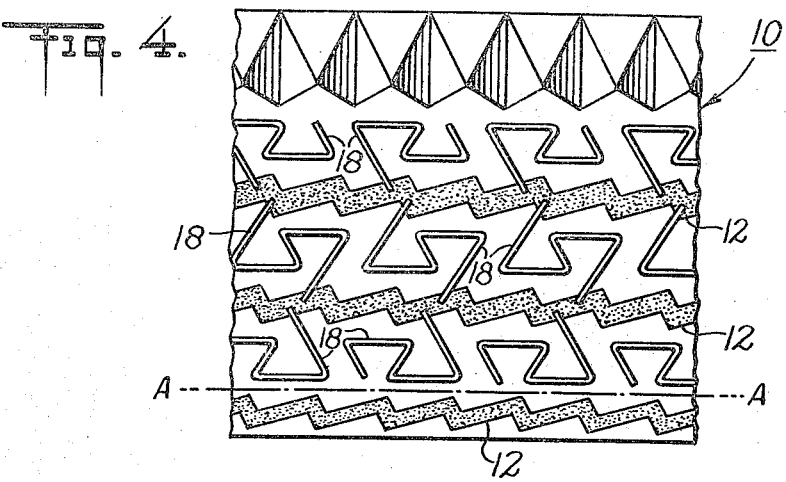
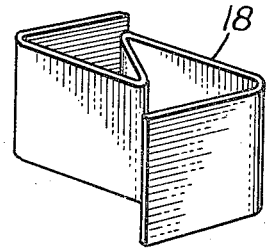
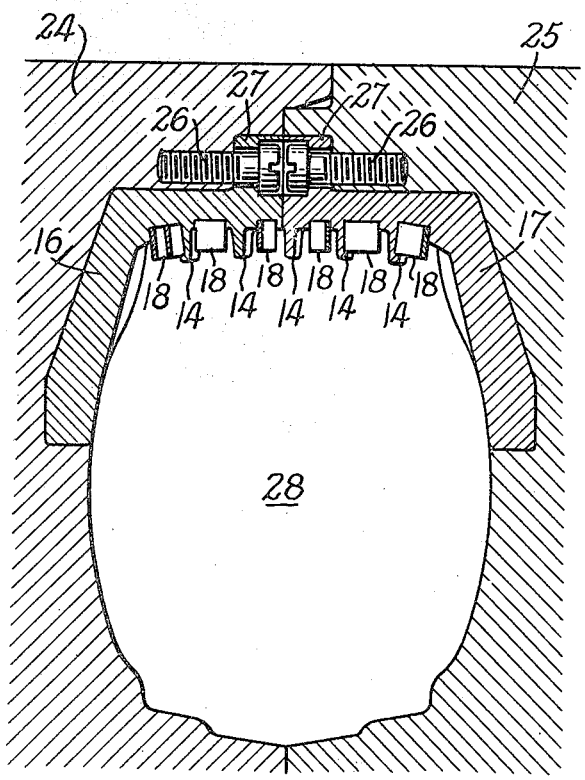
INVENTOR.
Robert A. Spitler
BY Curtis, Morris + Safford
ATTORNEYS

United States Patent Office 2,765,508
Patented Oct. 9, 1956

2,765,508

METHOD OF PROTECTING MOLD SURFACE DURING PLACEMENT OF METAL INSERTS IN A TIRE MOLD

Robert A. Spitler, Xenia, Ohio, assignor to Morris Bean and Company, Yellow Springs, Ohio Application March 18, 1953, Serial No. 343,113

5 Claims. (Cl. 22—203)

This invention relates to the making of molds for casting, and more particularly for castings with preformed inserts integrally emplaced therein.

It has been known for many years that in the treads of rubber tires and rubber footwear the most effective anti-slip qualities were imparted by forming narrow contiguous projections which under tractive force bend one against the other so that each acts as a squeegee to wipe off the lubricating film of water from the tractive surface, so that the next portion of the tread can have a better hold on it. This was first demonstrated by making closely spaced transverse cuts with a sharp knife; but that method is too expensive for general application to automobile tires, and some of the most effective designs for the cuts are not feasible for cutting in this way from a solid tread portion. Although rubber treads have been molded with squeegee designs, the close spacing of the squeegee parts of the tread, which was known to be advantageous, had to yield to the need for width of the slit-molding parts of the tread mold sufficient to withstand the stresses of manufacturing use. By our Patent No. 2,263,001, Gunsaulus and Bean have shown how this may be accomplished by use of inserts of strong sheet metal in a cast tread mold. In the particular process disclosed the sheet metal inserts are fitted into slots in the pattern; and, when the plaster is poured thereon and set to form a casting mold, the inserts are embedded in the plaster to the extent that they had projected above the pattern.

When slits are to be used closer together, and especially in more complex tread designs, it becomes more difficult to fit the inserts into a pattern and especially to remove the pattern from the casting mold without damaging the pattern or the casting mold (both of which I shall refer to generally under the term "mold"). My present invention provides a better method of locating and using such inserts without damage. The inserts can be located in a mold so close together or in areas of such detail configuration that damage would have been inevitable with prior manufacturing methods. To this end the mold surface in and adjacent to the areas of such inserts is supported by an easily removable protective layer during driving of the inserts and the supporting material is then removed without damaging the mold. According to the invention also, the pattern can be made without inserts and without means for their placement and the casting mold then formed on the pattern, likewise without the inserts.

Advantageously the mold is made of a material such as plaster, bonded sand etc., which is locally collapsible in that when a nail or insert is driven into it, the porous structure is collapsed locally under the insert without breaking up the mold. The inserts are placed in the resulting mold by thus forcing them into the mold material at the proper location and to the depth which is to project when it is transferred to the casting made from said mold.

Although some materials in some molds can satisfactorily withstand such placing of inserts without injury, experience with inserts placed close together or in detail configuration areas has shown that the inserts tend to chip the mold surface. My present invention provides for control of such chipping by supporting the mold surface in the areas adjoining the location of each insert, so that it is held against any deformation which could open a permanent crack. I have found that such support can be effectively and inexpensively provided by applying a relatively easily punctured and easily removable, supporting material adhesive to the mold surface. This material should be one which yields locally to allow penetration of the insert without propagating a crack and without transmitting such forces as would deform the surfaces of said detail configuration. Among such materials may be mentioned soft plastic materials, fusible at temperatures which do not destroy the mold, materials having fusible cohesive bond, disintegrable by fusing said bond, and materials having soluble cohesive bond disintegrable by dissolving the bond in solvent which does not injure the mold surface. Numerous such materials are known from which selection can be readily made by those skilled in the art. This material, however, must not of itself or by impregnating the surface of the mold material form a layer so tough as to prevent puncture when the insert is pressed with force sufficient to produce local collapse of the porous mold material. Such collapse before puncture would produce a sloping indent, altering the detail contours of the mold face, before allowing the insert to enter the mold material.

Although I shall now give a specific example of my invention as shown in the accompanying drawings and although I refer herein to certain specific preferences, recommendations and alternatives, it is to be understood that these are not exhaustive or limiting of the invention but are illustrative and for the purpose of instructing others in the principles of the invention and the manner of its use to the end that they may be enabled not only to use it in the particular embodiment shown but to so modify it and adapt it to various needs and conditions of use as to make the invention fully available to the public after the term of this patent has run its full course.

In the drawings:

Figure 1 is a plan view of a portion of the tread section of the casting mold on which is to be cast a metal tread insert for a tire mold to be used for vulcanizing pneumatic rubber tires.

Figure 2 is a cross section taken on line 2—2 of Figure 1 showing the plaster mold as formed having design detail filled with wax preparatory to but before placing of the inserts.

Figure 3 is a view corresponding to that of Figure 2 but showing the same after driving of inserts into the mold, melting out of the wax, assembling the mold with a cope and pouring of the metal thereinto.

Figure 4 is a plan view corresponding to that of Figure 1 but with the wax still in position for supporting the design detail, but after placing of the inserts shown in Figure 3.

Figure 5 is an isometric view showing one of the inserts.

Figure 6 is a view in cross-section showing a standard tire mold assembled ready for molding of a pneumatic tire, with the tread mold castings in place with the inserts embedded in the castings.

Referring first to Figures 1 and 2, I have shown there a mold designed for casting aluminum tread molds for manufacture of pneumatic tires. In the particular embodiment which these figures represent, the casting-mold part 10 is of plaster having a smooth fine-grained surface and oolitic structure in the interior giving a very high porosity for eventual use in casting tire tread molds, e. g., as described in the Bean Patent No. 2,220,703. The drawing shows only a segment of one-half of the tire tread to a central plane, the other half of the tire in this case being identical and symmetrical and the remainder of the ring continuing the repeat design shown, so that two tread molds made in this way can be put together to mold the full tread of the tire, e. g., as shown in Figure 6.

As shown in Figure 1, a tread design appears without any transverse squeegee slitting but with circumferential zig-zag grooves 12.

According to the present invention, these grooves 12 which in the plaster mold present rather fragile square edges are first filled with paraffin wax poured in molten while the plaster is cold enough to keep the wax from sinking into it. This is shown in Figures 2 and 4; as seen there the paraffin wax supports the fragile edges when the inserts are driven into the plaster.

These inserts, as shown for example in Figures 4 and 5, are made of strips of sheet metal bent to the desired form to provide the squeegee slit; and a series of these inserts are driven into the tread mold parts between the grooves 12 and with their ends extending into the grooves, as shown in Figure 4, so as to anchor them in the ribs 14 of the metal casting 16 and 17. As these inserts are driven down, whether by steady pressure or by hammering, they readily penetrate the plaster and the paraffin, but the paraffin supports the plaster adjacent the edges so that the stresses imposed on the plaster cannot form cracks or drive out chips of the material from the surface. The result is shown in Figures 3 and 4. Each of the inserts 18 is anchored in the plaster with a part extending into the paraffin in the grooves 12 and a part projecting above the surface of the mold.

When the inserts are thus assembled, the mold 10 is heated above the melting point of the paraffin and the paraffin allowed to drain out of the grooves 12 after which the mold is assembled with the cope section 19 and/or other mold or investment parts and the aluminum or other desired metal cast therein to form the tire tread mold 16 as shown in Figure 6.

Because of the design of the particular tread in this case, with one of the grooves formed by ribs 18 lying along the central plane of symmetry, the parting line of the tire mold is offset to one side so as not to divide the central ridge 14. The other half of the tread mold is formed by the mold part 16 which is made identically with the mold part 17, excepting that it has only two instead of three ribs 14, i. e., its edge would come at the broken line A in Figure 1 instead of at the bottom of Figure 1 as shown.

In Figure 6, inter-fitting standard steel mold rings 24 and 25 are shown in fragmentary section with the tread molds 16 and 17 fitted therein and bolted in place by means of bolts 26 extending through the flanges 27 on the tread molds, and into the mold rings, respectively.

As will be seen in Figure 6, the inserts 18 which were located in the mold 10 have become integrally anchored in the castings 16 and 17 by virtue of the molten metal, when cast, flowing around the projecting ends and edges of the inserts. When the mold material is removed, the portions of the inserts 18 which had been driven down into the mold are now exposed and project into the rubber-molding cavity 28. When a tire is vulcanized in the mold as shown in Figure 6, rubber is forced down in the tread areas between the groove-forming ridges 14 and around and into the spaces between these and the inserts 18. Thus, when the tread is vulcanized and completed and removed from the mold it has numerous slits corresponding to the inserts 18 which form squeegee edges on the tread portions to make a most efficient anti-skid tire.

It will be seen that in this use of the invention the inserts are readily driven into the mold part 10 without any danger of chipping, that the supporting material which is initially filled into the grooves 12 is readily disintegrated, e. g., by being poured off as a liquid, after the inserts are in place and that the inserts transfer themselves, without any further care, from the mold in which they are originally placed to the castings 16 or 17 which is formed by casting onto the mold. Thus, I have provided a thoroughly practicable and simple solution to a most troublesome problem experienced before my invention, and to which no satisfactory solution has heretofore appeared.

I claim:

1. The method of making castings with projecting metal inserts which comprises making a casting mold of a disintegrable porous material having a detail configuration area, including raised and recessed areas, in which said inserts are to be located, reinforcing the surface of said mold in the area on and around the location of each insert by a cohesive plastic material softer than the adjoining mold material and disintegrable by treatment which does not impair the surface of the mold, forcing the insert through said plastic into the porous material of the mold to a depth in said mold equal to the required projection from the casting and leaving a root portion of the insert projecting from said mold material, disintegrating the reinforcing plastic and removing it from, and without disintegrating, the mold surface, flowing the casting material onto said mold and around the projecting root of the insert, and, after the casting material has solidified, disintegrating the mold material and removing it from around the insert.

2. The method defined in claim 1 in which the reinforcing is by application of said material in fused condition thereby forming a fusible cohesive bond and the resulting coat is disintegrated for removal by heating above its melting point.

3. The method of preparing molds for making castings with projecting metal inserts which comprises making a mold of a disintegrable porous material having a detail configuration area, including raised and recessed areas, in which said inserts are to be located, reinforcing the surface of said mold in the area on and around the location of each insert by a cohesive puncturable material readily removable by treatment which does not impair the surface of the mold, forcing the insert through said puncturable material into the porous material of the mold and leaving a root portion of the insert projecting from said mold material, removing the reinforcing material from, and without disintegrating, the mold surface, leaving said mold surface exposed and the root of the insert projecting thereabove.

4. The method of preparing molds for making castings with projecting metal inserts which comprises making a casting mold of a porous frangible material, a detail configuration area of said mold having raised and recessed areas therein in which said inserts are to be located, filling the recessed areas over and adjoining the location of the inserts, respectively, with a fusible waxy material, forcing the projecting portion of each insert through the waxy material and into the mold material beneath to a depth equal to the required projection of the insert from the casting, fusing and draining out the waxy material to expose the detail configuration and projecting root portions of said inserts, for casting metal thereagainst.

5. The method of preparing molds for making aluminum and like castings with projecting metal inserts which comprises making a casting mold of a porous oolitic plaster with fine plaster surface, a detail configuration area of said mold having raised and recessed areas therein in which said inserts are to be located, filling the recessed areas over and adjoining the location of the inserts, respectively, with paraffin wax, forcing the projecting portion of each insert through the wax and into the mold material beneath to a depth equal to the required projection of the insert, and fusing and draining out the wax to expose the detail configuration and projecting root portions of said inserts for casting the metal thereon.

References Cited in the file of this patent

UNITED STATES PATENTS

| | | |
|---|---|---|
| 2,069,669 | Gill | Feb. 2, 1937 |
| 2,263,001 | Gunsaulus et al. | Nov. 18, 1941 |
| 2,593,547 | Duerksen | Apr. 22, 1952 |